Dec. 25, 1934.　　　A. VISCHER, JR　　　1,985,391
PROPULSION DEVICE
Filed May 14, 1932
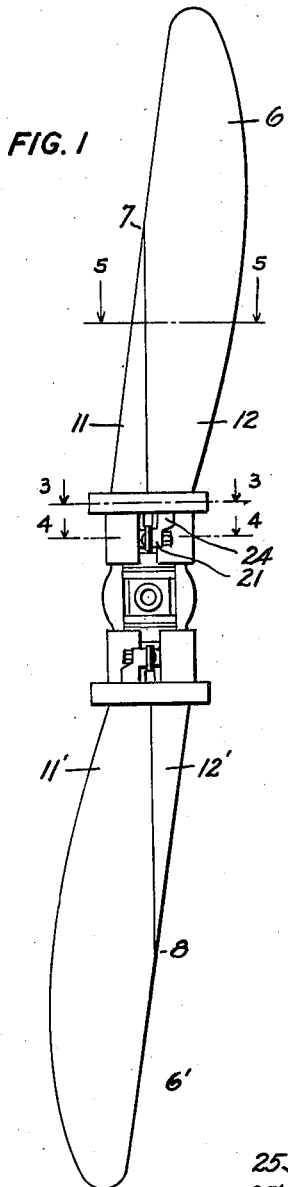
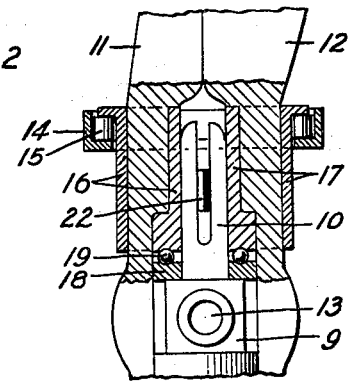
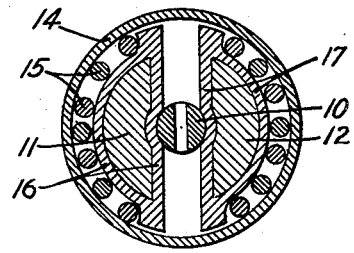
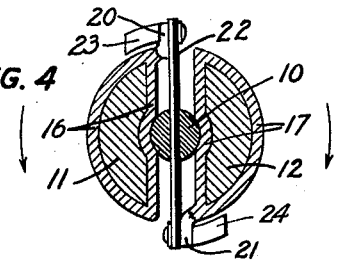
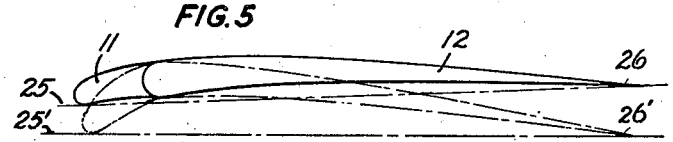
INVENTOR
ALFRED VISCHER Jr.
BY
ATTORNEY Patented Dec. 25, 1934

1,985,391

UNITED STATES PATENT OFFICE 1,985,391

PROPULSION DEVICE

Alfred Vischer, Jr., Ridgewood, N. J.

Application May 14, 1932, Serial No. 611,249

4 Claims. (Cl. 170—162)

This invention relates to propulsion devices and more especially to such devices used either for propelling a gaseous or fluid medium or, viewed in another way, for propelling an object through a gaseous or fluid medium. It is to be understood that the term propel etc. as used hereinafter is intended to include the terms repel and impel also.

To a very great extent such propulsion devices follow what has come to be known as the screw propeller and the terms pitch angle, chord etc. are well known in the art.

There is one general factor which applies to fluid mediums regardless of the density thereof, and that is the pitch angle of the propeller. The amount of pitch and speed of rotation are somewhat closely related and the pitch of a propeller at a given speed in water will be different from that at the same speed in air. Also in aviation it is well known that in the less dense atmosphere of high altitudes the aircraft propeller with fixed pitch and constant speed of rotation is less effective than is the same propeller at lower altitudes where the density of the air is greater. In other words aircraft equipped with fixed pitch propellers move more slowly at high altitudes than at low altitudes when the speed of rotation of the propeller is the same.

The term aircraft as used herein is not to be limited to machines heavier than air but is intended to include those lighter than air.

An object of this invention is a propulsion device, the pitch of which may be varied while such device is in operation. Another object of the invention is a variable pitch propeller in which the tendency of the parts to separate under the action of centrifugal force is greatly diminished.

A still further object is a variable pitch propeller in which a delicate control may be exercised and still be extremely compact, strong and inexpensive to manufacture.

Considering a two-bladed variable pitch propeller the pitch may be changed by moving the blades individually about a longitudinal axis in opposite directions. With such a structure the propeller is divided into two parts by a plane passing through the center of rotation of the propeller and perpendicular to the longitudinal axis of the blades.

Such a structure makes each blade a separate element and the entire mass of each is effective in tending to pull apart at the hub. To counteract the forces existent and to provide gearing etc. necessary to change the relative positions of the blades, requires a complicated and expensive mechanism near the hub of such a nature that another hazard is added to the safety of flying.

A second means of dividing the propeller is by means of a plane perpendicular to the plane of the first method, which plane also passes through the center of rotation. This will divide each blade into equal parts about a radius perpendicular to that plane which divides the two bladed propeller into two distinct and separate blades. In this case the centrifugal force which is exerted on the adjusting mechanism of the first case is nearly eliminated but no change in pitch is accomplished.

Applicant's invention resides in dividing the propeller by a plane which passes through the center of rotation perpendicular to the plane of rotation of the propeller and which may take any position between the limiting positions of the planes just defined whereby the advantages of such limiting planes may be obtained with a minimum of the attendant disadvantages.

The invention will be better understood from the following description, together with the attached drawing, forming a part thereof, in which:

Fig. 1 is an elevation of a propeller embodying the invention;

Fig. 2 is an enlarged view partly in section of that part of the propeller just above the hub;

Fig. 3 is a section taken at line 3—3 of Fig. 1;

Fig. 4 is a section at line 4—4 of Fig. 1; and

Fig. 5 is an enlarged section of the blade at line 5—5 showing the chord angle change resulting from an equal but opposite angular displacement of the blade sections.

Referring now particularly to Fig. 1 the blades 6 and 6' are shown arranged for rotation in a counter-clockwise direction, that is, the leading edge is at the left of the upper blade and the trailing edge is at the right.

Each blade is divided into two sections along line 7—8 by a plane perpendicular to the plane of rotation of the propeller. These two sections are fitted together so as to form a smooth surface as shown in Fig. 5. This particular construction is not essential and in some cases it may be preferable to have these sections separated. With such construction the propeller blades will have the additional advantages obtained by what has come to be known as the slotted wing construction in aeroplanes.

The hub structure and mechanism by means of which the two sections of the blade are moved relatively to each other may more easily be seen from Figs. 2, 3 and 4. The description will be directed primarily to upper blade 6 since the structure of lower blade 6' is identical.

In Fig. 2 the main hub block 9 having projecting spindle 10 is shown provided with cylindrical hole 13 adapted to receive the motor shaft. Any means may be adopted to fasten the motor shaft to the propeller hub such as keys or plates with the necessary bolts and nuts, which arrangements are well known.

The two sections 11 and 12 of blade 6 (Fig. 1) are continuations of the two sections 11' and 12' of blade 6'. Section 11, 11' is identical to section 12, 12' and, preferably may be made from the same pattern. Also section 11 is integral with and a continuation of section 11'. This is also true of 12, 12'.

These two sections 11 and 12 may be held in position by means of a clamp ring 14 shaped as shown to retain a series of rollers 15 against collars 16 and 17 which surround and are fitted as shown to sections 11 and 12 respectively. Collars 16 and 17 are provided with projections to retain rollers 15.

As shown in Fig. 2 the portion of collars 16 and 17 adjacent spindle 10 are provided with ball races which correspond with a ball race in bearing ring 18 surrounding spindle 10. Balls 19 complete this bearing.

Lugs 20 and 21 (Fig. 4) are provided on collars 16 and 17. A piece of thermostatic metal 22 which is held firmly in the slot in spindle 10 is fastened by bolts and nuts or other equivalent means to the lugs 20 and 21. Extensions 23 and 24 of lugs 20 and 21 support clamp ring 14 and keep it from slipping out of position when the propeller is stopped in an upright position.

The change in relative positions of the blade sections is accomplished by applying heat to the thermostatic piece 22 thereby causing it to bend and move its extremities, which are attached to the lugs 21 and 22, in the directions shown by the arrows in Fig. 4.

An enlarged section taken at line 5—5 Fig. 1, of the upper blade 6 when at normal or at ground level pitch is shown in solid lines in Fig. 5. The chord of the cambered section is shown at 25, 26. Upon the application of heat to the thermostatic piece 22 and the resultant bend, the blade sections take the position shown in dot-dash line. The chord after such movement is shown at 25', 26'. The change in pitch is readily seen.

Whereas a thermostatic piece of metal and its action under the application of heat has been described, the invention contemplates any mechanism which will cause the relative movement of the blade sections such as disclosed in applicant's U. S. Patent 1,443,644 January 30, 1923.

Heat for actuating the thermostatic piece may be obtained from the motor exhaust or from electric current applied to a resistance element adjacent the thermostatic piece. It is also contemplated within the spirit of this invention that the thermostatic piece of metal may be used to change the pitch of the propeller automatically with changing temperature as the aeroplane changes its altitude since there is usually a close relation between temperature and altitude which latter is an indication, within limits, of the rarefaction of the atmosphere.

The clamp ring 14 through the medium of rollers 15 holds the sections of the propeller together. Generally speaking the forces tending to disengage the parts along line 7, 8 are relatively small. The bearing comprising ring 18, balls 19 and the races in collars 16 and 17 take up what little thrust may be present due to centrifugal force. These bearings greatly reduce friction when the blade sections are moved relatively to each other.

It will readily be seen that the tendency of the propeller to come apart under the action of centrifugal force is very greatly minimized. The largest forces will be due to section 12 in one direction and section 11' in the opposite direction. These forces however, are to a great extent counterbalanced by the nearly equal weights of the sections on either side of the axis of rotation. The slight unbalance is exerted on the bearing consisting of ring 18 and balls 19 etc.

There is no mechanism such as gears etc. upon which the centrifugal forces act since the blade sections are continuous and hence no tendency for the blade structure to loosen or become shaky due to use.

What is claimed is:

1. A fluid propulsion device comprising a hub portion, a plurality of members extending therefrom, said members being divided radially, a section of one member being a continuation of a section of the diametrically opposite member and means for moving the sections relatively to each other.

2. An aeroplane propeller comprising a plurality of blades, each blade divided into two parts, a section of one part of one blade being a continuation of a part of another blade and means for moving said parts relatively to each other.

3. An aeroplane propeller comprising a plurality of blades mounted diametrically opposite each other, said blades being divided into two parts along a radial line, a portion of the leading edge of each blade being a continuation of the trailing edge of a diametrically opposite blade.

4. An aeroplane propeller comprising a plurality of blades, each blade divided into two parts, a portion of the leading edge of each blade being a continuation and an integral part of the trailing edge of another blade, the line of division of said blades being such that equal angular movements of said parts cause a greater lateral movement of the trailing edge than of the leading edge.

ALFRED VISCHER, Jr.